No. 746,006. PATENTED DEC. 8, 1903.
M. S. BRIGHAM.
WASHER.
APPLICATION FILED FEB. 7, 1903.
NO MODEL.
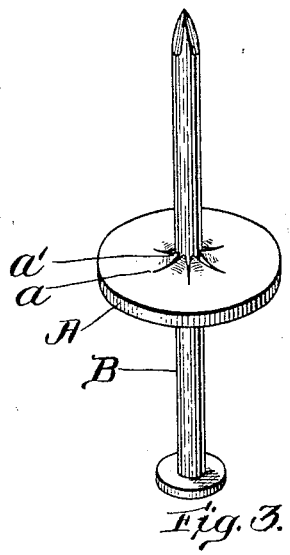
Fig. 3.
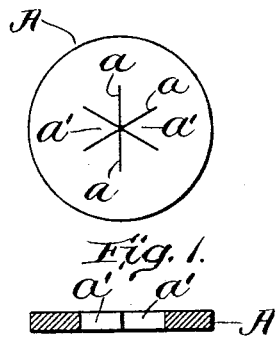
Fig. 1.
Fig. 2.
Witnesses:
Arthur J. Randall
Grace E. Gibbons
Inventor:
Melville S. Brigham,
by Roberts & Mitchell
Attorneys.

No. 746,006. Patented December 8, 1903.

UNITED STATES PATENT OFFICE.

MELVILLE S. BRIGHAM, OF HINGHAM, MASSACHUSETTS.

WASHER.

SPECIFICATION forming part of Letters Patent No. 746,006, dated December 8, 1903.

Application filed February 7, 1903. Serial No. 142,275. (No model.)

*To all whom it may concern:*

Be it known that I, MELVILLE S. BRIGHAM, a citizen of the United States, and a resident of Hingham, in the county of Plymouth and State of Massachusetts, have invented new and useful Improvements in Washers, of which the following is a specification.

My invention consists of improvements in the construction of washers, and particularly in the construction of washers of flexible compressible material. Such washers as have been used heretofore have circular holes in their centers, which consequently fit and thus cling to nails or screws only of the size corresponding to the central hole. It has been usual also to perforate a solid washer by driving in the nail or screw with which it is to be used eventually when it is desired to have the washer cling closely to the nail or screw. This, however, requires some labor and, moreover, is not productive of uniformly good results, as washers, especially in the hands of careless or hurried persons, are very likely to be perforated out of center, and thus present an ungainly appearance when in use. By my invention I provide a washer ready to be applied to a nail or screw which can be applied easily and with slight pressure of the fingers, which centers itself upon the nail or screw, and which is adapted to adjust itself automatically to nails or screws of various diameters, clings to the nail or screw, will not slip therefrom, and is accurately centered thereon.

In the drawings hereto annexed, which illustrate my invention, Figure 1 is a plan view of a washer centrally perforated in a manner to be presently described. Fig. 2 is a vertical cross-section of the washer shown in Fig. 1, and Fig. 3 shows the washer with a nail inserted and partially thrust through it.

In the material of the washer A, which is preferably constructed of cardboard, leatherboard, or similar flexible compressible material, instead of the usual circular perforation I cut intersecting slits $a$, which at their place of junction form converging tongues $a'$. If now a nail, such as B, be pressed against the joining-place of the slits $a$, the tongues $a'$ will yield readily to it and permit its passage and at the same time by reason of their elasticity press against the side of the nail, so that the washer is held upon the nail securely and is accurately centered. When the nail is driven into any material, the pressure exerted in driving the nail home will compress the deflected tongues $a'$, so that the washer will lie as flat and compactly as will a washer perforated with a circular hole in the usual manner. Within reasonable limits such a washer as above described will fit any size of nail which may be selected, and by using such washers the necessity of providing washers with various sizes of perforations or making a perforation in a solid washer with the nail wherewith it is to be used will be entirely obviated. This will be appreciated by workmen in many situations. For instance, the men employed to install electric wiring are obliged to use porcelain cleats and knobs, which are fixed to parts of buildings sometimes by screws or sometimes by nails, and it is essential to provide washers to protect the knob or cleat from the impact of the hammer as the nail is driven home. It is well known that in doing work of this character the workmen are often placed in awkward and disadvantageous positions, as on stepladders, so that when washers are used the workman often finds himself annoyed by having to find a washer and to put it on the nail or in having to make a perforation in the washer with the nail itself.

With my improved washer herein described the workman is enabled to string washers on nails before starting out to work and can fill his pocket with nails provided in this manner.

The work of applying the washers is very easy, and it does not occupy nearly so much time as driving nails into solid washers, and by using my improvement the washer is accurately centered on the nail, whatever its size. The tongues $a'$ cling closely to the nail, so that there is no danger of the washer slipping therefrom, and the workman always finds nails and washers assembled ready to hand when he most needs them, whereas when ready-perforated washers are used if the workman strings them on nails beforehand they are quite likely to slip off the nails before he is ready to use them.

What I claim, and desire to secure by Letters Patent, is—

1. A washer perforated with intersecting slits to form converging flexible tongues.

2. A washer of flexible compressible material perforated with intersecting slits to form converging tongues.

Signed by me at Boston, Suffolk county, Massachusetts, this 14th day of January, 1903.

MELVILLE S. BRIGHAM.

Witnesses:
JOSEPH T. BRENNAN,
GRACE E. GIBBONS.